(12) United States Patent
Kawanishi et al.

(10) Patent No.: US 7,239,763 B2
(45) Date of Patent: Jul. 3, 2007

(54) OPTICAL SSB MODULATOR

(75) Inventors: Tetsuya Kawanishi, Koganei (JP); Masayuki Izutsu, Koganei (JP); Kaoru Higuma, Tokyo (JP); Shingo Mori, Tokyo (JP)

(73) Assignees: National Institute of Information and Communications Technology, Incorporated Administrative Agency, Tokyo (JP); Sumitomo Osaka Cement Co., Ltd, Tokyo (JP)

( * ) Notice: Subject to any disclaimer, the term of this patent is extended or adjusted under 35 U.S.C. 154(b) by 87 days.

(21) Appl. No.: 11/085,609

(22) Filed: Mar. 22, 2005

(65) Prior Publication Data

US 2005/0220385 A1 Oct. 6, 2005

(30) Foreign Application Priority Data

Mar. 24, 2004 (JP) ............................. 2004-085966

(51) Int. Cl.
*G02F 1/225* (2006.01)
(52) U.S. Cl. .................... 385/1; 385/39; 385/3; 385/40
(58) Field of Classification Search .................... None
See application file for complete search history.

(56) References Cited

U.S. PATENT DOCUMENTS

| | | | | |
|---|---|---|---|---|
| 4,860,279 | A * | 8/1989 | Falk et al. ..................... | 398/43 |
| 5,333,000 | A * | 7/1994 | Hietala et al. ............... | 342/368 |
| 6,334,004 | B1 * | 12/2001 | Ohkuma et al. ............... | 385/2 |
| 2001/0005437 | A1 * | 6/2001 | Masuda et al. ................ | 385/2 |
| 2002/0130251 | A1 * | 9/2002 | Myers et al. ................ | 250/226 |
| 2003/0219188 | A1 * | 11/2003 | Doi et al. ....................... | 385/3 |

* cited by examiner

*Primary Examiner*—Rodney Bovernick
*Assistant Examiner*—Mike Stahl
(74) *Attorney, Agent, or Firm*—Westerman, Hattori, Daniels & Adrian, LLP

(57) ABSTRACT

An optical SSB modulator capable of appropriately adjusting a phase difference of light in the MZ waveguides and automatically adjusting a voltage impressed to the bias adjustment electrodes is provided. The above-mentioned object is achieved by an optical SSB modulator (1) provided with a first sub Mach-Zehnder waveguide ($MZ_A$) (2), a second sub Mach-Zehnder waveguide ($MZ_B$) (3), a main Mach-Zehnder waveguide ($MZ_C$) (4), a first bias adjustment electrode ($DC_A$ electrode) (5), a second bias adjustment electrode ($DC_B$ electrode) (6), a first modulation electrode ($RF_A$ electrode) (7), a second modulation electrode ($RF_B$ electrode) (8) and a third bias adjustment electrode ($DC_C$ electrode) (9), wherein either one of or both of output portions (10, 11) of the $MZ_A$ and the $MZ_B$ have an X-branching form, and specifically having one of light paths of the X-branching connected to a photodetector.

11 Claims, 6 Drawing Sheets

OPTICAL SSB MODULATOR

BACKGROUND OF THE INVENTION

1. Field of the Invention

The present invention relates to an optical modulator, and in particular to an optical SSB modulator in which an asymmetrical X-branching is provided to output portions of sub Mach-Zehnder (MZ) waveguides composing the optical SSB modulator, thereby appropriately adjusting a phase of light in the MZ waveguides.

2. Description of the Related Art

In a wavelength multiplexing optical communication system of the next generation, it is expected that a switch-over between wavelength channels is performed in a node. Therefore, a wavelength conversion apparatus is required in the wavelength multiplexing optical communication system. As a wavelength conversion apparatus, an optical single sideband (SSB) modulator is known. The optical SSB modulator is an optical modulator which can obtain an output light having shifted for a frequency of a modulating signal (e.g. as described in [S. Shimotsu, S. Oikawa, T. Saitou, N. Mitsugi, K. Kubodera, T. Kawanishi and M. Izutsu, "Single Side-Band Modulation Performance of a LiNbO3 Integrated Modulator Consisting of Four-Phase Modulator Waveguide," IEEE Photon. Tech. Lett., Vol. 13, 364–366 (2001)] and [Shimotsu Shinichi, Masayuki Izutsu, "LiNbO3 optical single-sideband modulator for next-generation communication", Optical Alliance, 2000.7. pp. 27–30]).

FIG. 7 is a schematic diagram showing a basic arrangement of an optical SSB modulator. As shown in FIG. 7, an optical SSB modulator 101 is provided with a first sub Mach-Zehnder waveguide ($MZ_A$) 102, a second sub Mach-Zehnder waveguide ($MZ_B$) 103, a main Mach-Zehnder waveguide ($MZ_C$) 104, a first bias adjustment electrode ($DC_A$ electrode) 105, a second bias adjustment electrode ($DC_B$ electrode) 106, a first modulation electrode ($RF_A$ electrode) 107, a second modulation electrode ($RF_B$ electrode) 108 and a third bias adjustment electrode ($DC_C$ electrode) 109.

The main Mach-Zehnder waveguide ($MZ_C$) 104 is a Mach-Zehnder waveguide including the $MZ_A$ and $MZ_B$ as both of its arms.

The first bias adjustment electrode ($DC_A$ electrode) 105 is an electrode for controlling a bias voltage between two arms (Path 1 and Path 3) composing the $MZ_A$, thereby controlling a phase of light transmitted through the two arms of the $MZ_A$. On the other hand, the second bias adjustment electrode ($DC_B$ electrode) 106 is an electrode for controlling a bias voltage between two arms (Path 2 and Path 4) composing the $MZ_B$, thereby controlling a phase of light transmitted through the two arms of the $MZ_B$.

The first modulation electrode ($RF_A$ electrode) 107 is an electrode for inputting a radio frequency (RF) signal to the two arms composing the $MZ_A$. On the other hand, the second modulation electrode ($RF_B$ electrode) 108 is an electrode for inputting the RF signal to the two arms composing the $MZ_B$.

The third bias adjustment electrode ($DC_C$ electrode) 109 is an electrode for controlling the bias voltages of the $MZ_A$ and the $MZ_B$, thereby controlling the phase of light transmitted through the $MZ_A$ and the $MZ_B$. The third bias adjustment electrode ($DC_C$ electrode) is usually a direct current electrode or a low frequency electrode.

FIG. 8 is a schematic diagram showing an optical spectrum at each point of the optical SSB modulator of FIG. 7 in case an upper sideband is generated. At point P and point Q of FIG. 7, light of both sidebands is present. However, as for the output light, components (light of lower sideband in FIG. 8) whose phases are reversed at point P and point Q cancel each other, so that only the light of the single sideband (upper sideband in FIG. 8) is outputted.

In an optical SSB modulator, in order to obtain the above-mentioned output, sinusoidal RF signals with phases different from each other by 90° are inputted to four optical phase modulators paralleled, and bias voltages to be impressed to the bias adjustment electrodes ($DC_A$ electrode, $DC_B$ electrode and $DC_C$ electrode) are adjusted so that mutual phase differences are respectively 90° with respect to light. When this is done, light having an optical frequency shifted as much as the frequency (fm) of the modulating signal is obtained as an output. Directions of frequency shifting (whether the frequency is increased or decreased by fm) can be selected by setting the bias voltage to be impressed to the $DC_C$ electrode.

More specifically, a bias voltage ($DC_A$) impressed to the $DC_A$ electrode is controlled so that the light phase difference between Path 1 and Path 3 of FIG. 7 assumes 180°. Also, a bias voltage ($DC_B$) impressed to the $DC_B$ electrode is controlled so that the light phase difference between Path 2 and Path 4 assumes 180°. Then, a bias voltage ($DC_C$) impressed to the $DC_C$ electrode is controlled so that the light phase difference between the two sub MZ waveguides assumes 90°.

It is to be noted that the operation of an conventional optical SSB modulator is described in detail in for example, [Tetsuya Kawanishi, Masayuki Izutsu, "Optical frequency shifter using optical SSB modulator", TECHNICAL REPORT OF IEICE, OCS2002-49, PS2002-33, OFT2002-30 (2002–08)] and [Higuma et al., "X-cut lithium niobium optical SSB modulator, Electron Letter, vol. 37, 515–516 (2001)].

In the conventional optical SSB modulator, the bias voltage has been adjusted as follows in order to obtain a phase of light in the arm of each MZ waveguide described above. Namely, voltages impressed to the $DC_A$ electrode and the $DC_B$ electrode are slightly adjusted so that the output from the third MZ waveguide is minimized. Thereafter, voltages are impressed to the modulation electrodes, and a voltage impressed to the $DC_C$ electrode is slightly adjusted so that unnecessary contents included in the output light are minimized. Occasionally, the voltages impressed to the modulation electrodes are slightly adjusted. Such operations were repeated. However, there are cases in which the output from the third MZ waveguide becomes 0 even when the optical phases in both arms of the waveguides ($MZ_A$ 102 and $MZ_B$ 103) are not mutually different by 180°. Therefore, there has been a problem that the phase of light cannot always be appropriately adjusted with such a voltage adjustment method.

Also, in the conventional optical SSB modulator, light other than the output light such as the light of the single sideband (light of lower sideband in FIG. 8) that is not outputted due to mutual cancellation has leaked out of the modulator from the circuit. There has been a problem that such a leaked light degrades the performance of the optical SSB modulator.

Moreover, in the conventional optical SSB modulator, fine adjustments are repeated by observing the output light, so that there has been a problem that the voltage impressed to the bias adjustment electrode cannot be automatically adjusted, e.g. as described in Shimotsu Shinichi, Masayuki Izutsu, "LiNbO3 optical SSB modulator for next-generation communication", Optical Alliance, 2000.7. Pp. 27–30.

SUMMARY OF THE INVENTION

The present invention is made to solve the above-mentioned problems in the conventional optical modulator. Namely, an object of the present invention is to provide an optical SSB modulator capable of appropriately adjusting a phase difference of light in the MZ waveguides.

Also, another object of the present invention is to provide an optical SSB modulator capable of reducing light leaking out of the modulator.

Also, another object of the present invention is to provide an optical SSB modulator capable of automatically adjusting a voltage impressed to the bias adjustment electrodes.

In an optical SSB modulator of the present invention, an exit of at least one of the sub MZ waveguide is made an X-branching. Namely, as shown in FIG. 7, both an exit portion 110 of the conventional $MZ_A$ and an exit portion 111 of the $MZ_B$ have assumed a Y-branching. In the optical modulator of the present invention, by making an exit of the MZ waveguide an X-branching, and by checking an output of the MZ waveguide, optical phases in both arms (Path 1, Path 3) of the $MZ_A$ and both arms (Path 2, Path 4) of the $MZ_B$ can be appropriately checked. Moreover, in the optical modulator of the present invention, light leaking out of the modulator can be taken out from the X-branching, so that it is made possible to prevent leaking of light. As a result, the performance of the optical modulator can be improved. Moreover, since the magnitude of the voltage impressed to the electrodes can be recognized by the photodetectors, an optical SSB modulator capable of automatically adjusting a voltage impressed to the electrodes can be obtained.

(1) An optical SSB modulator of the present invention is provided with one or more sub Mach-Zehnder waveguides ($MZ_A$, $MZ_B$), wherein: an output portion (10, 11) of at least one sub Mach-Zehnder waveguide among the sub Mach-Zehnder waveguides has an X-branching form; and among two waveguides stretching from the X-branching formed output portion, one waveguide is connected to a photodetector for measuring a light intensity, and a remaining waveguide is a waveguide for an output light from the optical modulator.

As described above, the sub Mach-Zehnder waveguide of the optical SSB modulator of the present invention has an output portion of an X-branching form, so that a phase of light in the sub MZ waveguide of the optical SSB modulator can be adjusted, and the light can be prevented from leaking out.

(2) An arrangement of the optical SSB modulator according to the present invention will be specifically described as follows: Namely, the optical SSB modulator according to the present invention is provided with: a first sub Mach-Zehnder waveguide ($MZ_A$) 2; a second sub Mach-Zehnder waveguide ($MZ_B$) 3; a main Mach-Zehnder waveguide ($MZ_C$) 4 provided with the $MZ_A$ and the $MZ_B$; a first bias adjustment electrode ($DC_A$) 5 controlling a bias voltage between two arms composing the $MZ_A$, thereby controlling a phase of light propagating in the two arms of the $MZ_A$; a second bias adjustment electrode ($DC_B$) 6 controlling a bias voltage between two arms composing the $MZ_B$, thereby controlling a phase of light propagating in the two arms of the $MZ_B$; a first modulation electrode ($RF_A$) 7 inputting a radio frequency (RF) signal to the two arms composing the $MZ_A$; a second modulation electrode ($RF_B$) 8 inputting an RF signal to the two arms composing the $MZ_B$; and a third bias adjustment electrode ($DC_C$) 9 controlling the bias voltages of the $MZ_A$ and the $MZ_B$, thereby controlling a phase of light propagating in the $MZ_A$ and the $MZ_B$, an output portion of either one of or both of the $MZ_A$ and the $MZ_B$ has an X-branching form.

As described above, the sub Mach-Zehnder waveguide of the optical SSB modulator of the present invention has an output portion of an X-branching form, so that a phase of light in the sub MZ waveguide of the optical SSB modulator can be adjusted, and the light can be prevented from leaking out.

(3) An arrangement of an optical SSB modulator according an aspect of the present invention different from the one described above will be described as follows: Namely, an optical SSB modulator is provided with: a first sub Mach-Zehnder waveguide (2); a second sub Mach-Zehnder waveguide (3); a main Mach-Zehnder waveguide (4) provided with the first sub Mach-Zehnder waveguide and the second sub Mach-Zehnder waveguide; a first modulation electrode (7) inputting a radio frequency signal and a signal related to a bias voltage to two arms composing the first sub Mach-Zehnder waveguide; a second modulation electrode (8) inputting a radio frequency signal and a signal related to a bias voltage to two arms composing the second sub Mach-Zehnder waveguide; and a third bias adjustment electrode (9) controlling the bias voltages of the first and second sub Mach-Zehnder waveguides, thereby controlling a phase of light propagating in the first and second Mach-Zehnder waveguides, an output portion of either one of or both of the first and second sub Mach-Zehnder waveguides has an X-branching form.

As described above, the sub Mach-Zehnder waveguide of the optical SSB modulator of the present invention has an output portion of an X-branching form, so that a phase of light in the sub MZ waveguide of the optical SSB modulator can be adjusted, and the light can be prevented from leaking out. Also, in this aspect, a radio frequency signal and a signal related to a bias voltage can be inputted to respective modulation electrodes, so that electrodes can be reduced in number compared to the foregoing aspects.

(4) A preferable aspect of an optical SSB modulator is the optical SSB modulator described in any one of the above-mentioned (1)–(3), wherein the X-branching is an asymmetrical X-branching. When the X-branching is an asymmetrical X-branching, the output of the photodetector is maximized when the RF voltage is made an OFF state, so that noise-resistant control can be performed in case the voltage impressed to the bias adjustment electrode is controlled.

(5) Therefore, a preferable aspect of an optical SSB modulator is one described in the above-mentioned (4), wherein one light path of the X-branching is connected to a photodetector.

(6) A preferable aspect of an optical SSB modulator is one described in any one of the above-mentioned (1)–(5), further provided with: a photodetector connected to one light path of the X-branching; a control apparatus receiving information related to an amount of unnecessary light from the photodetector, obtaining voltage adjustment information for adjusting an amount of voltage impressed to a bias adjustment electrode of a sub Mach-Zehnder waveguide based on the information, and outputting the voltage adjustment information; and a first signal source impressing a voltage to the bias adjustment electrode of the sub MZ waveguide based on the voltage adjustment information outputted from the control apparatus. In more detail, among the two waveguides extending from the X-branching formed output portion, one waveguide is connected to a photodetector for measuring a light intensity, and a remaining waveguide is a waveguide for an output light from the optical modulator.

Such an optical SSB modulator can automatically adjust the voltage impressed to the bias adjustment electrode.

(7) As an application of an optical SSB modulator of the present invention, an optical FSK modulator wherein a combination of a modulation electrode and a bias adjustment electrode or a modulation electrode is substituted for the third bias adjustment electrode can be mentioned. In case a modulation electrode is substituted for the third bias adjustment electrode, a radio frequency signal and a signal related to a bias voltage is inputted to the modulation electrode by a bias circuit or the like.

The optical SSB modulator of the present invention adopts such arrangement as described above, so that at least one of the effects described hereinafter is achieved. Namely, in the optical SSB modulator of the present invention, an exit of at least one sub MZ waveguide is made an X-branching, and an output from one end of the X-branching is checked, so that a phase of light in the MZ waveguides can be appropriately checked.

Moreover, the optical SSB modulator of the present invention can take out light which has conventionally leaked out of a circuit from the X-branching, so that the performance of the optical SSB modulator can be improved.

Also with the present invention, since the magnitude of the voltage of the MZ waveguide can be observed by the photodetector, an optical SSB modulator capable of automatically adjusting a voltage impressed to the electrodes can be obtained.

DETAILED DESCRIPTION OF THE PREFERRED EMBODIMENTS

1. Embodiment of Optical SSB Modulator

Figure 1:
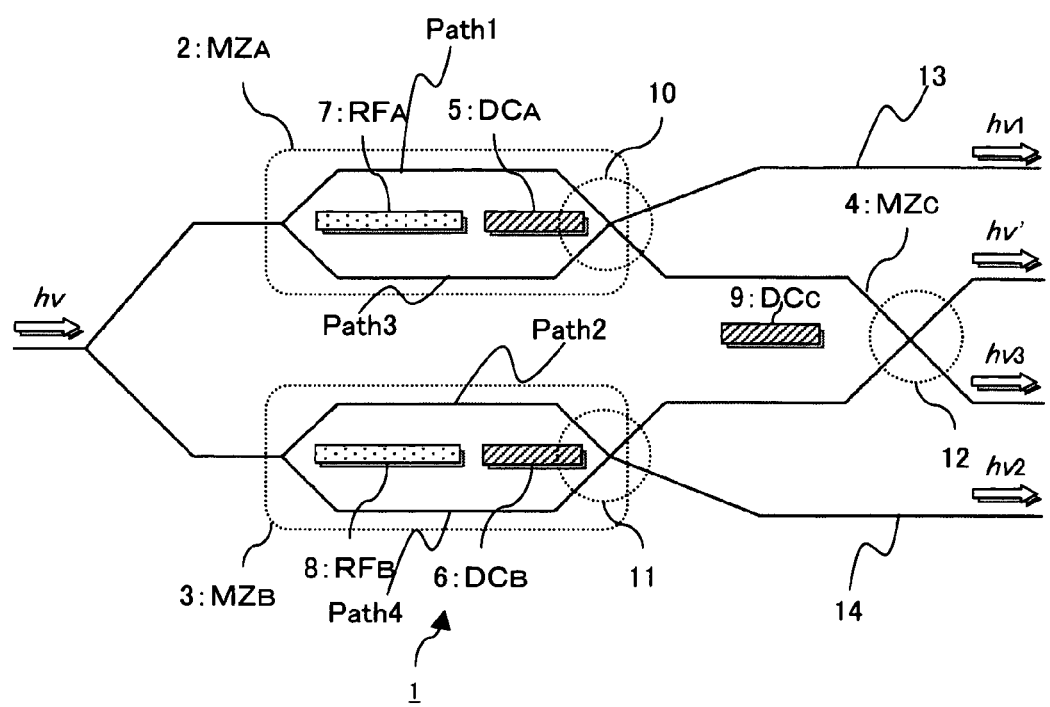
FIG. 1 is a schematic diagram showing a basic arrangement of an optical SSB modulator of the present invention.

Hereinafter, an embodiment of an optical SSB modulator of the present invention will be described referring to the drawing. FIG. 1 is a schematic diagram showing a basic arrangement of an optical SSB modulator of the present invention. As shown in FIG. 1, an optical SSB modulator (1) of this example is provided with a first sub Mach-Zehnder waveguide ($MZ_A$) (2), a second sub Mach-Zehnder waveguide ($MZ_B$) (3), a main Mach-Zehnder waveguide ($MZ_C$) (4), a first bias adjustment electrode ($DC_A$ electrode) (5), a second bias adjustment electrode ($DC_B$ electrode) (6), a first modulation electrode ($RF_A$ electrode) (7), a second modulation electrode ($RF_B$ electrode) (8) and a third bias adjustment electrode ($DC_C$ electrode) (9), and either one of or both of output portions (10, 11) of the $MZ_A$ and the $MZ_B$ may have an X-branching form. The basic operation of this optical SSB modulator is the same as that of the conventional optical SSB modulator. The main Mach-Zehnder waveguide ($MZ_C$) (4) is a Mach-Zehnder waveguide including the $MZ_A$ and the $MZ_B$ as both arms thereof. Hereinafter, a specific arrangement of the optical SSB modulator will be described. It is to be noted in FIG. 1 that 12 denotes the output portion of the $MZ_C$, hv (hah nu) denotes an input light, hv' denotes an output light of the optical SSB modulator, and $hv_1$, $hv_2$ and $hv_3$ denote unnecessary lights.

A Mach-Zehnder (MZ) waveguide is a waveguide usually provided with two arms. The optical SSB modulator of this example is provided with two sub Mach-Zehnder waveguides $MZ_A$ and $MZ_B$, and a main MZ waveguide $MZ_C$ in which the two sub MZ waveguides are made the two arms. A known MZ waveguide can be used as the MZ waveguides and are not specifically limited.

Figure 2:
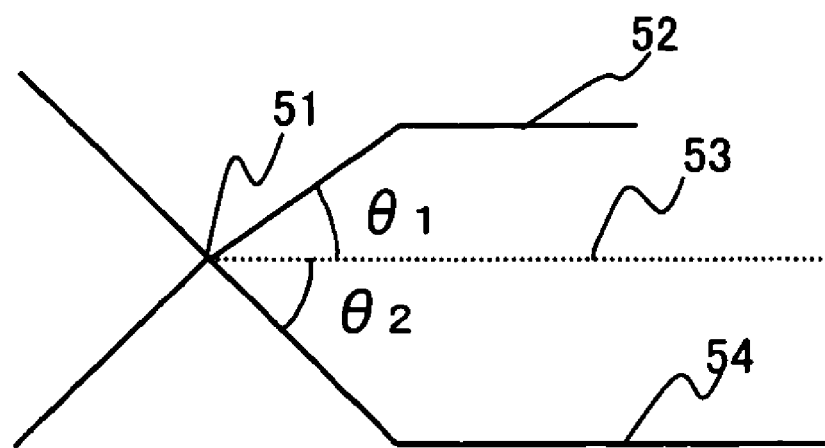
FIG. 2 is a diagram showing an example of an X-branching that is an asymmetric X-branching.

In the present invention, an output portion ((10) or (11) of FIG. 1) of at least one sub MZ waveguide has an X-branching. Hereinafter, an example of the X-branching will be described referring to the drawing. It is to be noted that as the X-branching, an asymmetric X-branching is preferable. By having an asymmetric X-branching, a noise-resistant control can be performed since a monitor output is maximized when an RF voltage is made an OFF state. FIG. 2 is a diagram showing an example of an asymmetric X-branching. In FIG. 2, 51 denotes a branching point of the MZ waveguide, 52 denotes a light path where the unnecessary light is propagated, 53 denotes a midline of the MZ waveguide, 54 denotes a light path where an output light of the MZ waveguide is propagated. The light path (52) is preferably connected to the photodetector so that an amount of light propagating through the light path (52) is measured. As an angle ($\theta_1$) formed by the light path (52) and the midline (53), 0.001°–10° is mentioned, where 0.01°–2.0° is preferable and 0.1°14 0.3° is more preferable. Also, as an angle ($\theta_2$) formed by the optical path (54) and the midline (53), 0.001°–10° is mentioned, where 0.01°–2.0° is preferable, 0.1°14 0.3° is more preferable and 0.2°–0.25° is specifically preferable. It is to be noted that as a relationship between $\theta_1$ and $\theta_2$, $\theta_1 > \theta_2$ can be mentioned for example.

The photodetector (PD) is a device connected to the light path for measuring the light quantity. As the photodetector, a known photodetector can be used without being specifically limited as long as a light quantity of the unnecessary light can be measured. As the photodetector, a photodiode or the like such as the one described in Hiroo Yonezu, "optical communication device engineering"—photoemitter/photoreceptor device—, Kougakutosho Ltd. 6-th edition, 2000, may be appropriately adopted.

It is to be noted that as will be described later, the output portion of the $MZ_C$ is usually a Y-branching, and need not be made an X-branching. However, it is preferable to make the output portion of the $MZ_C$ the X-branching, since the leaking of light can be prevented and the light amount can be measured.

As an electrode in the optical SSB modulator of the present invention, a bias adjustment electrode for controlling a phase of light propagating in the MZ waveguide and a modulation electrode for inputting a radio frequency (RF) signal that is a modulating signal can be mentioned. As a bias adjustment electrode, the first-third bias adjustment electrodes ($DC_A$ electrode (5), $DC_B$ electrode (6) and $DC_C$ electrode (9)) can be mentioned. On the other hand, as a modulation electrode, the first and second modulation electrodes ($RF_A$ electrode (7) and $RF_B$ electrode (8)) can be mentioned.

The $DC_A$ electrode (5) is an electrode for controlling the bias voltage between two arms (Path 1 and Path 3) composing the $MZ_A$, thereby controlling the phase of the light transmitted through the two arms of the $MZ_A$. On the other hand, the $DC_B$ electrode (6) is an electrode for controlling the bias voltage between two arms (Path 2 and Path 4) composing the $MZ_B$, thereby controlling the phase of the light transmitted through the two arms of the $MZ_B$. The $DC_A$ electrode and the $DC_B$ electrode are preferably direct current electrodes or low frequency electrodes. It is to be noted that "low frequency" in the low frequency electrode means frequency of e.g. 0 Hz–500 MHz. A traveling-wave-type electrode or a resonant-type electrode can be mentioned as the $DC_A$ electrode and the $DC_B$ electrode, and the resonant-type electrode is preferable.

The $DC_C$ electrode (9) is an electrode for controlling the phase of the light transmitted through the $MZ_A$ and the $MZ_B$ by controlling the bias voltages of the $MZ_A$ and the $MZ_B$. The $DC_C$ electrode is preferably a direct current electrode or a low frequency electrode. Although it is not specifically limited, the $DC_C$ electrode may be a traveling-wave-type electrode or a resonant-type electrode.

The $DC_A$ electrode, the $DC_B$ electrode and the $DC_C$ electrode are composed of e.g. gold, platinum or the like.

The $DC_A$ electrode, the $DC_B$ electrode and the $DC_C$ electrode are preferably connected to signal sources, respectively. The signal sources are devices for controlling the voltages impressed to the $DC_A$ electrode, the $DC_B$ electrode and the $DC_C$ electrode, and a known signal source can be respectively adopted.

The $RF_A$ electrode (7) is an electrode for inputting a radio frequency (RF) signal to the two arms composing the $MZ_A$. On the other hand, the $RF_B$ electrode (8) is an electrode for inputting the RF signal to the two arms composing the $MZ_B$. A traveling-wave-type electrode or a resonant-type electrode can be mentioned as the $RF_A$ electrode and the $RF_B$ electrode, and the resonant-type electrode is preferable.

The $RF_A$ electrode and the $RF_B$ electrode are preferably connected to a high frequency signal source. The high frequency electric signal source is a device for controlling the signal transmitted to the $RF_A$ electrode and the $RF_B$ electrode, for which a known high frequency electric signal source can be adopted. As frequencies of the high frequency signal inputted to the $RF_A$ electrode and the $RF_B$ electrode, e.g. 1 GHz–100 GHz can be mentioned. As the output of the high frequency electric signal source, a sinusoidal wave having a fixed frequency can be mentioned.

The $RF_A$ electrode and the $RF_B$ electrode are composed of e.g. gold, platinum or the like. As the width of the $RF_A$ electrode and the $RF_B$ electrode, 1 µm–10 µm can be mentioned and 5 µm can be specifically mentioned. As the length of the $RF_A$ electrode and $RF_B$ electrode, 0.1 times–0.9 times the wavelength (fm) of the modulating signal can be mentioned including 0.18–0.22 times or 0.67–0.70 times, and more preferably shorter than the resonant point of the modulating signal by 20–25%. This is because with such a length, the synthesized impedance remains in an appropriate region. As a more specific length of the $RF_A$ electrode and the $RF_B$ electrode, 3250 µm can be mentioned. Hereinafter, a resonant-type electrode and a traveling-wave-type electrode will be described.

A resonant-type optical electrode (resonant-type optical modulator) is an electrode for performing a modulation by using resonance of a modulating signal. A known resonant-type electrode such as those described in the Japanese patent application laid-open 2002-268025 and Tetsuya Kawanishi, Satoshi Oikawa, Masayuki Izutsu, "Planar structure resonant-type optical modulator", TECHNICAL REPORT OF IEICE, IQE2001-3 (2001–05).

A traveling-wave-type electrode (traveling-wave-type optical modulator) is an electrode (modulator) for modulating light while guiding waves so that a lightwave and an electric signal are guided in the same direction (e.g. Hiroshi Nishihara, Masamitsu Haruna, Toshiaki Suhara, "optical integrated circuit" (revised and updated edition), Ohmsha, pages 119–120). A known traveling-wave-type electrode such as those disclosed in Japanese patent application laid-open Nos. 11-295674, 2002-169133, 2002-40381, 2000-267056, 2000-47159, and 10-133159, for example, can be adopted as the traveling-wave-type electrode.

As a preferable traveling-wave-type electrode, a so-called symmetrical-type earth electrode arrangement (one provided with at least a pair of earth electrodes on both sides of a traveling-wave-type signal electrode) is adopted. Thus, by symmetrically arranging the earth electrodes sandwiching the signal electrode, a high frequency wave outputted from the signal electrode is made easy to be impressed to the earth electrodes arranged on the left and right of the signal electrode, thereby suppressing an emission of a high frequency wave to the side of the substrate.

2. Another Embodiment of Optical SSB Modulator

Figure 3:
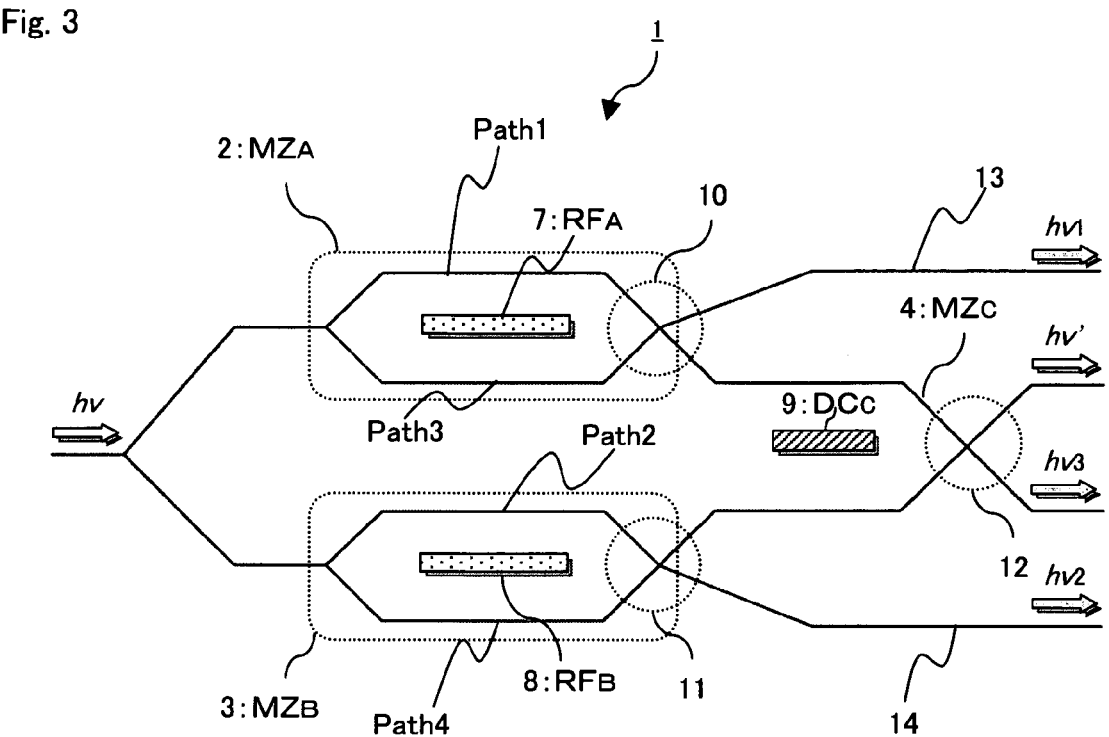
FIG. 3 is a schematic diagram showing a basic arrangement of an optical SSB modulator according to another aspect of the present invention.

FIG. 3 is a schematic diagram showing a basic arrangement of an optical SSB modulator of according to a different embodiment of the present invention. As shown in FIG. 3, the optical SSB modulator (1) of this example is provided with the first sub Mach-Zehnder waveguide ($MZ_A$) (2), the second sub Mach-Zehnder waveguide ($MZ_B$) (3), the main Mach-Zehnder waveguide ($MZ_C$) (4), the first modulation electrode ($RF_A$ electrode) (7), the second modulation electrode ($RF_B$ electrode) (8) and the third bias adjustment electrode ($DC_C$ electrode) (9). Output portions (10 and 11) of either one of or both of the $MZ_A$ and the $MZ_B$ have an X-branching form. The basic operation of this optical SSB modulator is the same as that of the conventional optical SSB modulator.

In the optical SSB modulator of this embodiment, the RF electrode acts as both of the electrodes for the RF signal and the DC signal in the optical SSB modulator described above. Namely, either one of or both of the $RF_A$ electrode and the $RF_B$ electrode are connected to a feeder circuit (bias circuit) for supplying the DC signal and the RF signal mixed. Since the optical SSB modulator of this embodiment has the RF electrode connected to the feeder circuit (bias circuit), the RF signal (radio frequency signal) and the DC signal (direct current signal: signal related to bias voltage) can be inputted to the RF electrode, so that it can function in the same way as the optical SSB modulator described above.

3. Manufacturing Method

As a manufacturing method of the above-mentioned optical SSB modulator, a known manufacturing method such as an internal diffusion method of a titanium diffusion method and the like or a proton exchange method can be used. For example, a method of directly forming an electrode on an LN substrate without providing a buffer layer over a part of or the entire substrate by a thermal diffusion of titanium on the LN substrate can be mentioned. Also, a signal electrode and an earth electrode may be prepared by providing a buffer layer over the LN substrate and further forming thereon electrode patterns with titanium, gold or the like. Also, the optical modulator may have a multilayer structure with a film provided over a buffer layer. It is to be noted that a buffer layer formed of a dielectric can be mentioned, and more specifically a buffer layer formed of silicon dioxide can be mentioned. As for more specific manufacturing method of the optical SSB modulator, those described in the following documents may be used as appropriate: Japanese patent application laid-open No. 2000-180802, [S. Shimotsu, S. Oikawa, T. Saitou, N. Mitsugi, K. Kubodera, T. Kawanishi and M. Izutsu, "Single Side-Band Modulation Performance of a LiNbO3 Integrated Modulator Consisting of Four-Phase Modulator Waveguides," IEEE Photon. Tech. Lett., Vol. 13, 364–366 (2001)], [Tetsuya Kawanishi, Masayuki Izutsu, "Optical frequency shifter using optical SSB modulator", TECHNICAL REPORT OF IEICE, OCS2002-49, PS2002-33, OFT2002-30 (2002–08)], [Tetsuya Kawanishi, Satoshi Oikawa, Masayuki Izutsu, "Planar structure resonant-type optical modulator", TECHNICAL REPORT OF IEICE, IQE2001-3 (2001–05)], [Higuma et al., "X-cut lithium niobium optical SSB modulator, Electron Letter, vol. 37, 515–516 (2001)] and [Hiroshi Nishihara, Masamitsu Haruna, Toshiaki Suhara, "optical integrated circuit" (revised and updated edition), Ohmsha, 2002). Specifically, with respect to a manufacturing method of an asymmetric crossed waveguide, those described in Shimotsu Shinichi, Masayuki Izutsu, "LiNbO3 optical SSB modulator for next-generation communication", Optical Alliance, 2000.7. pp. 27–30 and the like may be used.

4. Operation Example

By using the above-mentioned optical SSB modulator, the unnecessary lights (lights other than the SSB light) can be outputted through light paths for unnecessary light as shown by 13 or 14 in FIG. 1. Accordingly, with the above mentioned optical SSB modulator, while suppressing the events where the unnecessary light leaks out from the circuit, the optical SSB modulation can be performed.

Also, when the photodetectors are connected to the light paths (13) and (14) for the unnecessary light, the photodetectors can always detect the amount of unnecessary light propagating through the light path for the unnecessary light, so that the voltage amount impressed to the sub MZ waveguides can be appropriately adjusted. More specifically, the voltage amounts impressed to the sub MZ waveguides are adjusted so that the light amount of the unnecessary light becomes maximum or minimum or the spectrum of the unnecessary light assumes a predetermined state. Thus, the appropriate impressed voltage can be recognized.

5. Optical SSB Modulator with Impressed Voltage Automatic Adjustment Function

Figure 4:
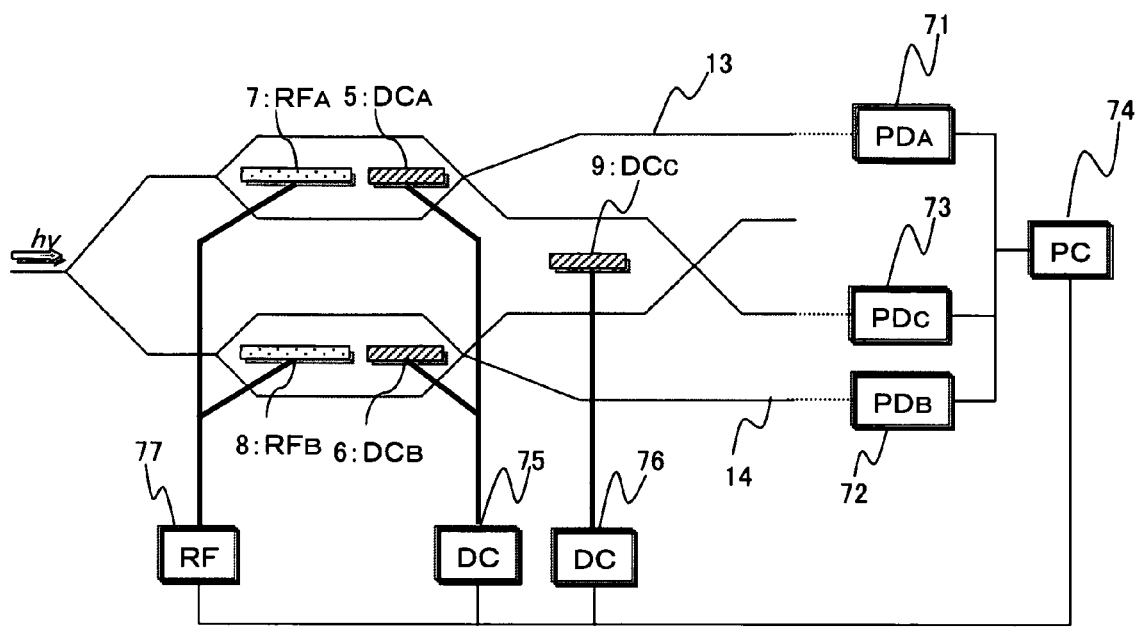
FIG. 4 is a schematic diagram showing an example of an optical SSB modulator with an impressed voltage automatic adjustment function.

Hereinafter, an embodiment of an optical SSB modulator different from those described above will be described. FIG. 4 is a schematic diagram showing an example of an optical SSB modulator with an impressed voltage automatic adjustment function capable of automatically adjusting the voltage impressed to the bias adjustment electrode ($DC_A$ electrode or $DC_B$ electrode) of the sub MZ waveguide.

As shown in FIG. 4, the optical SSB modulator of this example provides the above mentioned optical SSB modulator with a first photodetector ($PD_A$) (71) and a second photodetector ($PD_B$) (72) for measuring amounts of unnecessary lights in the sub MZ waveguide, a control apparatus (PC) (74) for receiving information related to the amount of unnecessary light in the MZ waveguides from the photodetectors and for outputting voltage adjustment information for adjusting the voltage amounts to be impressed to the bias adjustment electrode ($DC_A$ electrode or $DC_B$ electrode) of the sub MZ waveguide based on the information and a first signal source (75) for impressing a voltage to the bias adjustment electrode ($DC_A$ electrode or $DC_B$ electrode) of the sub MZ waveguide based on the voltage adjustment information from the control apparatus.

In this optical SSB modulator, the first signal source (75) impresses the amount of voltage adjusted based on the voltage adjustment information from the controlling apparatus (74) to the bias adjustment electrode ($DC_A$ electrode or $DC_B$ electrode) of the sub MZ waveguide. Therefore, the impressed voltage of the bias adjustment electrode, namely the phase of light propagating in the sub MZ waveguide can be automatically adjusted, which has been difficult to adjust conventionally.

As a method for obtaining the voltage adjustment information in the control apparatus, for example, the control apparatus may obtain the amount of the impressed voltage so that the amount of unnecessary light is reduced as much as possible from the information related to the voltage impressed to the bias adjustment electrode of the sub MZ waveguide and the information related to the output amount of the unnecessary light from the sub MZ waveguide at a certain point. Alternatively, the amount of the unnecessary light may be increased as much as possible or the spectrum of the unnecessary light may be made a predetermined state.

It is to be noted that the optical SSB modulator of this example may be provided with a third photodetector ($PD_C$) (73) for measuring an amount of unnecessary light in the $MZ_C$, and a second signal source (76) for impressing a voltage to the bias adjustment electrode ($DC_C$ electrode) of the main MZ waveguide based on the voltage adjustment information from the control apparatus. With such an optical SSB modulator, the voltage impressed to the $DC_C$ electrode can be automatically controlled by using the second signal source (76).

It is to be noted that the optical SSB modulator of this example may be provided with an RF signal source (77) for impressing a voltage to the modulation (RF) electrode ($RF_A$ electrode or $RF_B$ electrode) of the sub MZ waveguide based on the voltage adjustment information from the control apparatus. With such an optical SSB modulator, the voltage impressed to the modulation electrode can be automatically controlled by using the RF signal source (77).

6. Example of Optical SSB Modulator other than Ones Described Above

Figure 5:
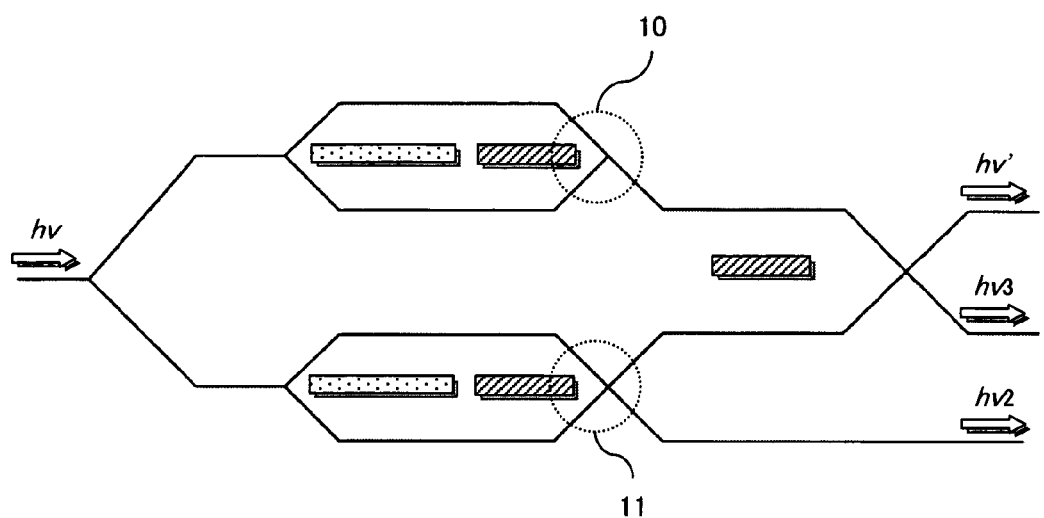
FIG. 5 is a schematic diagram showing an example of an optical SSB modulator with only an output portion (11) of one sub MZ waveguide of the two sub MZ waveguides being an X-branching.

FIG. 5 is a schematic diagram of an example of an optical SSB modulator in which only the exit portion (11) of one sub MZ waveguide of the two sub MZ waveguides is an X-branching. In this example, the exit portion (10) of the $MZ_A$ is a Y-branching. Thus, even with the optical SSB modulator capable of observing output for only one of the sub MZ waveguides, it can easily make voltage adjustment so that the light leaking out of the circuit can be suppressed compared to the conventional optical SSB modulator.

Figure 6:
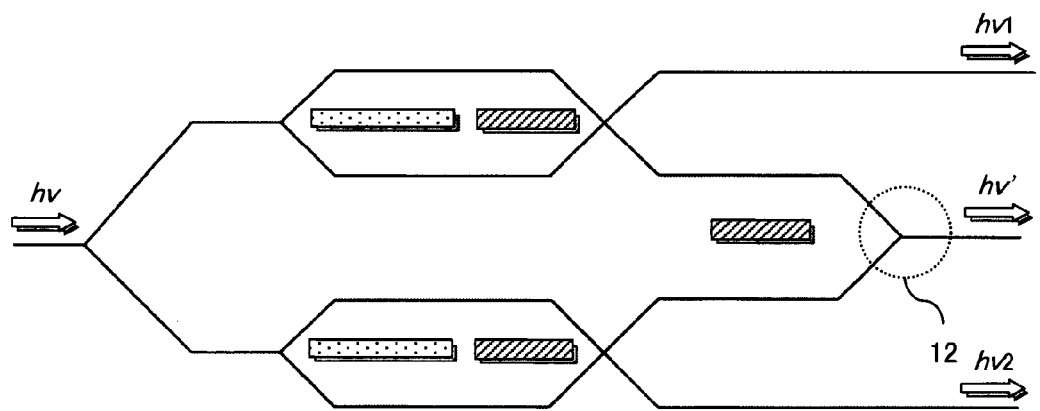
FIG. 6 is a schematic diagram showing an optical SSB modulator with an output portion (12) of the $MZ_C$ being made a Y-branching.
Figure 7:
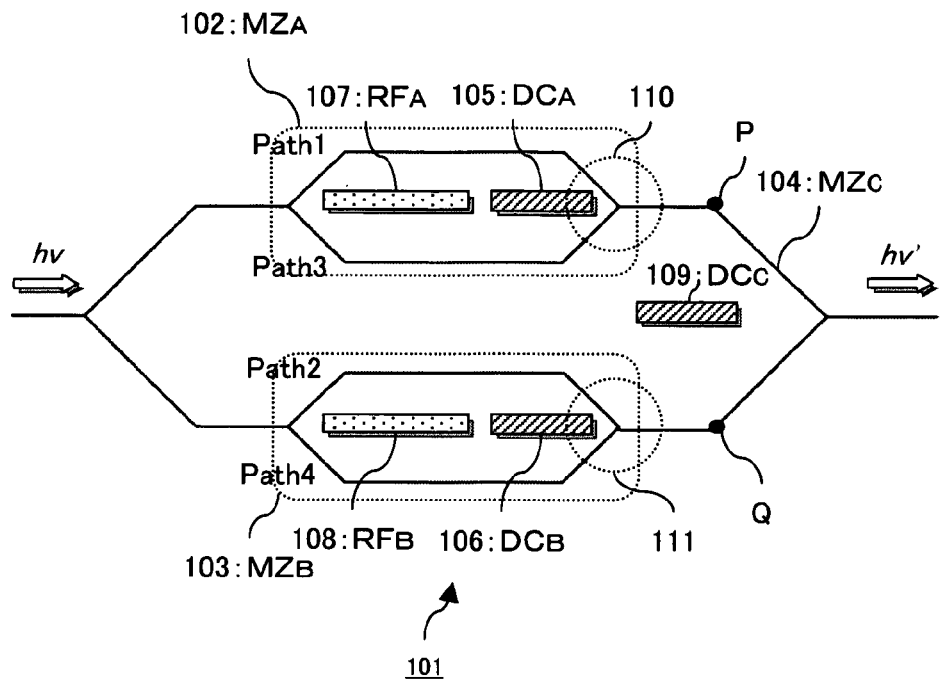
FIG. 7 is a schematic diagram showing a basic arrangement of an optical SSB modulator.
Figure 8:
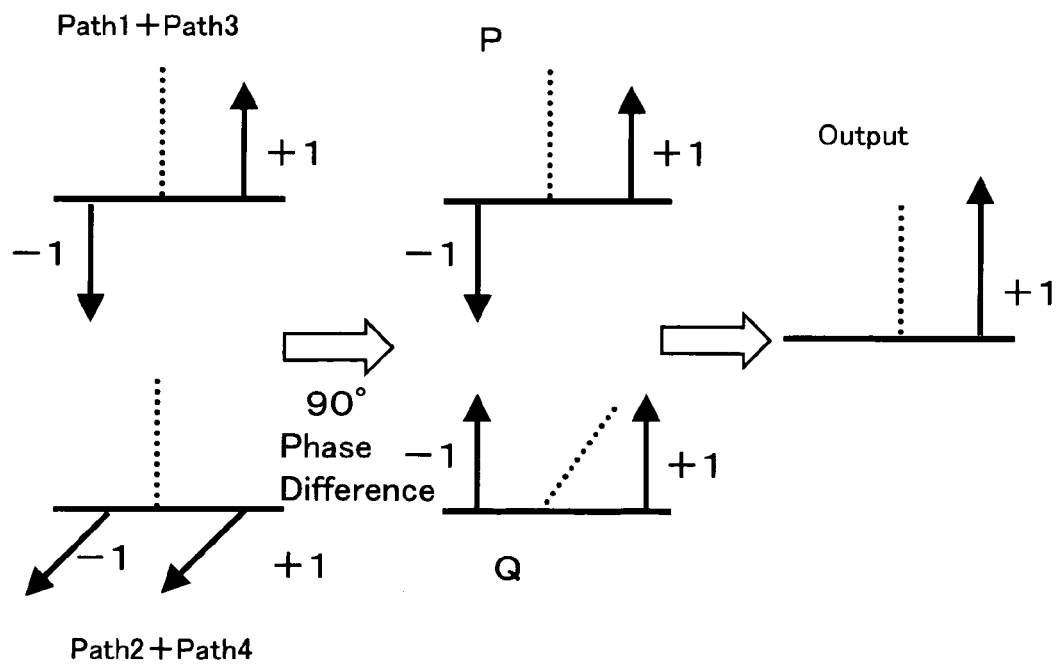
FIG. 8 is a schematic diagram showing an optical spectrum at each point of the optical SSB modulator of FIG. 7 in case an upper sideband is generated.

FIG. 6 is a schematic diagram showing an example of an optical SSB modulator in which the output portion (12) of the $MZ_C$ is a Y-branching. As described above, since a preferable phase of light can be achieved if the voltage impressed to the bias adjustment electrode of the $MZ_A$ or the $MZ_B$ can be adjusted, the optical SSB modulator of the present invention may have the output portion (12) of the $MZ_C$ made a Y-branching.

7. Optical FSK Modulator

The optical SSB modulators described so far can be applied, as is, to the optical FSK modulator. An optical frequency shift keying (FSK) is a technology which applies modulation to a frequency of light and transmits variations in the frequency as a signal. An FSK signal generally carries no information on its amplitude, so that it has a feature of being less subject to a level fluctuation or noise. In the optical FSK modulator, in order to realize a high speed code switching, a combination of an RF (radio frequency) electrode and a DC electrode or with only the RF electrode (in this case RF electrode is used for both RF and DC) is substituted for an electrode corresponding to the $DC_C$ of the optical SSB modulator. Supposing that an electrode used instead of the $DC_C$ electrode is the $RF_C$ electrode, the $RF_C$ electrode is preferably a traveling-wave-type electrode supporting a high speed switching. Also in the FSK modulator, the upper wave component and the lower wave component can be switched over to be outputted by switching over the signal voltage of the $RF_C$ electrode. When a traveling-wave-type electrode corresponding to the RF frequency is used as the $RF_C$ electrode, the above-mentioned frequency shifting can be performed at a high speed, so that this is preferable.

As a signal source for controlling the signal transmitted to the $RF_C$ electrode of the optical FSK modulator, a known signal source can be adopted. The use of a signal source (FSK signal source), as a signal source of the optical FSK modulator, which can set a plurality of voltage levels to be switched over is preferable since the optical FSK modulator is enabled to perform a multivalued modulation. As a signal to be inputted from the signal source to the $RF_C$ electrode, a signal having a frequency component of preferably between 500 MHz and 300 GHz both inclusive can be mentioned, which preferably assumes 500 MHz–10 GHz. It is to be noted that the frequency of the signal transmitted to the $RF_C$ electrode controlled by the signal source is preferably smaller compared to the frequencies of the signals transmitted to the $RF_A$ electrode and the $RF_B$ electrode controlled by the high frequency electric signal source. This is because the apparatus becomes complicated if the frequency of the signal transmitted to the $RF_C$ electrode controlled by the signal source is larger compared to the frequencies of the signals transmitted to the $RF_A$ electrode and the $RF_B$ electrode controlled by the high frequency electric signal source.

8. Multi Phase Modulation System

The optical SSB modulator of the present invention and the optical FSK modulator can be used in multi phase modulation system such as 4-phase modulation (DQPSK) system. Namely, with the present invention a multi phase modulator can be provided. Specifically, the $RF_A$ electrode and the $RF_B$ electrode may be driven by 2v π, D(B)PSK signal may be inputted from these electrodes, and $DC_c$ electrode ($RF_c$) electrode may be adjusted so that the phase difference of light between the two signals assumes 90°.

What is claimed is:

1. An optical single side band (SSB) modulator comprising:
    one or more sub Mach-Zehnder waveguides; and
    a main Mach-Zehnder waveguide provided with the one or more sub Mach-Zehnder waveguides;
    wherein:
    an output portion of at least one sub Mach-Zehnder waveguide among the sub Mach-Zehnder waveguides has an X-branching form; and
    among two waveguides stretching from the X-branching formed output portion, one waveguide is connected to a photodetector for measuring a light intensity, and a remaining waveguide is a waveguide for an output light from the optical modulator.

2. An optical SSB modulator comprising:
    a first sub Mach-Zehnder waveguide;
    a second sub Mach-Zehnder waveguide;
    a main Mach-Zehnder waveguide provided with the first sub Mach-Zehnder waveguide and the second sub Mach-Zehnder waveguide;
    a first bias adjustment electrode controlling a bias voltage between two arms composing the first sub Mach-Zehnder waveguide, thereby controlling a phase of light propagating in the two arms of the first sub Mach-Zehnder waveguide;
    a second bias adjustment electrode controlling a bias voltage between two arms composing the second sub Mach-Zehnder waveguide, thereby controlling a phase of light propagating in the two arms of the second sub Mach-Zehnder waveguide;
    a first modulation electrode inputting a radio frequency signal to the two arms composing the first sub Mach-Zehnder waveguide;
    a second modulation electrode inputting a radio frequency signal to the two arms composing the second sub Mach-Zehnder waveguide; and
    a third bias adjustment electrode controlling the bias voltages of the first and second sub Mach-Zehnder waveguides, thereby controlling a phase of light propagating in the first and second Mach-Zehnder waveguides,
    wherein an output portion of either one of or both of the first and second sub Mach-Zehnder waveguides has an X-branching form.

3. An optical SSB modulator comprising:
    a first sub Mach-Zehnder waveguide;
    a second sub Mach-Zehnder waveguide;
    a main Mach-Zehnder waveguide provided with the first sub Mach-Zehnder waveguide and the second sub Mach-Zehnder waveguide;
    a first modulation electrode inputting a radio frequency signal and a signal related to a bias voltage to two arms composing the first sub Mach-Zehnder waveguide;
    a second modulation electrode inputting a radio frequency signal and a signal related to a bias voltage to two arms composing the second sub Mach-Zehnder waveguide; and
    a third bias adjustment electrode controlling the bias voltages of the first and second sub Mach-Zehnder waveguides, thereby controlling a phase of light propagating in the first and second Mach-Zehnder waveguides,
    wherein an output portion of either one of or both of the first and second sub Mach-Zehnder waveguides has an X-branching form.

4. The optical SSB modulator as in any one of claims 2 and 3, wherein the X-branching is an asymmetrical X-branching.

5. The optical SSB modulator as claimed in claim 4, wherein one light path of the X-branching is connected to a photodetector.

6. The optical SSB modulator as claimed in any one of claims 1–3, further comprising:
    a photodetector connected to one light path of the X-branching;

a control apparatus receiving information related to an amount of unnecessary light from the photodetector, obtaining voltage adjustment information for adjusting an amount of voltage impressed to a bias adjustment electrode of a sub Mach-Zehnder waveguide based on the information, and outputting the voltage adjustment information; and a first signal source impressing a voltage to the bias adjustment electrode of the sub Mach-Zehnder waveguide based on the voltage adjustment information outputted from the control apparatus.

7. An optical frequency shift keying modulator comprising the optical SSB modulator as claimed in claim 2, wherein a combination of a modulation electrode and a bias adjustment electrode or a modulation electrode is substituted for the third bias adjustment electrode.

8. An optical frequency shift keying modulator comprising the optical SSB modulator as claimed in claim 3, wherein a combination of a modulation electrode and a bias adjustment electrode or a modulation electrode is substituted for the third bias adjustment electrode.

9. An optical frequency shift keying modulator comprising the optical SSB modulator as claimed in claim 4, wherein a combination of a modulation electrode and a bias adjustment electrode or a modulation electrode is substituted for the third bias adjustment electrode.

10. An optical frequency shift keying modulator comprising the optical SSB modulator as claimed in claim 5, wherein a combination of a modulation electrode and a bias adjustment electrode or a modulation electrode is substituted for the third bias adjustment electrode.

11. The optical SSB modulator according to claim 1, wherein the X-branching is an asymmetrical X-branching.

* * * * *